US008482616B2

(12) United States Patent
Jang

(10) Patent No.: US 8,482,616 B2
(45) Date of Patent: Jul. 9, 2013

(54) ELECTRONIC APPARATUS, REMOTE CONTROLLER AND ERROR DETECTING METHOD

(75) Inventor: Bong-ki Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 12/776,950

(22) Filed: May 10, 2010

(65) Prior Publication Data

US 2011/0025856 A1    Feb. 3, 2011

(30) Foreign Application Priority Data

Jul. 28, 2009    (KR) .................. 10-2009-0068947

(51) Int. Cl.
*H04N 5/50*    (2006.01)

(52) U.S. Cl.
USPC ........................................................ 348/189

(58) Field of Classification Search
USPC .................. 348/189, 180, 552–553; 725/26, 725/34; 714/57
See application file for complete search history.

(56) References Cited

U.S. PATENT DOCUMENTS

| 5,943,092 | A  | * | 8/1999  | Chuang et al. ............. 348/177 |
| 6,173,422 | B1 | * | 1/2001  | Kimura et al. ............... 714/57 |
| 6,421,793 | B1 | * | 7/2002  | Lester et al. ................. 714/37 |
| 7,024,119 | B1 | * | 4/2006  | Mier-Langner et al. ...... 398/106 |
| 7,024,698 | B2 | * | 4/2006  | Tanaka et al. ................ 726/26 |
| 7,027,736 | B1 | * | 4/2006  | Mier-Langner et al. ...... 398/106 |
| 7,103,800 | B2 | * | 9/2006  | Hasako et al. ................. 714/25 |
| 7,345,700 | B2 | * | 3/2008  | Nortrup ...................... 348/180 |
| 7,885,431 | B2 | * | 2/2011  | Kim .............................. 382/107 |
| 2002/0062259 | A1 | * | 5/2002  | Katz et al. ..................... 705/26 |
| 2002/0065950 | A1 | * | 5/2002  | Katz et al. ................... 709/318 |
| 2005/0165597 | A1 | * | 7/2005  | Nightingale ................. 703/27 |
| 2007/0288331 | A1 | * | 12/2007 | Ebrom et al. ................. 705/27 |
| 2009/0006970 | A1 |   | 1/2009  | Jeffery et al. |
| 2012/0050500 | A1 | * | 3/2012  | Yamaguchi ................... 348/51 |

FOREIGN PATENT DOCUMENTS

| EP | 0949625 A1 | 10/1999 |
| EP | 1881710 A1 | 1/2008 |

OTHER PUBLICATIONS

Extended European Search Report issued Oct. 27, 2010, in Application No. 10163713.0.
Communication dated Jan. 13, 2012 from the European Patent Office in counterpart European application No. 10163713.0.

* cited by examiner

*Primary Examiner* — Paulos M Natnael
(74) *Attorney, Agent, or Firm* — Sughrue Mion, PLLC

(57) ABSTRACT

The electronic apparatus includes; a user interface which generates a module mapping signal corresponding to one of the driving modules; a controller which determines whether an error has occurred in the driving module and an error warning unit which warns a user if it is determined that the driving module has an error. A remote controller includes a user selection unit through which a user individually selects a driving module and a communicating unit which outputs a module mapping signal corresponding to the driving module selected by a user. 109 An error detecting method includes receiving a module selection signal to select one of the driving modules; determining whether an error has occurred in the driving module; and warning a user when an error occurs in the driving module according to determination results.

13 Claims, 6 Drawing Sheets

ELECTRONIC APPARATUS, REMOTE CONTROLLER AND ERROR DETECTING METHOD

CROSS-REFERENCE TO RELATED APPLICATION

This application claims priority from Korean Patent Application No. 10-2009-0068947, filed on Jul. 28, 2009 in the Korean Intellectual Property Office, the disclosure of which is incorporated herein by reference.

BACKGROUND OF INVENTION

1. Field of Invention

Apparatuses and methods consistent with exemplary embodiments of the present invention relate to an electronic apparatus, a remote controller and an error detecting method.

2. Description of the Related Art

When an electronic apparatus such as a television operates abnormally due to an error, a user may request a repair service from a service center and thus a repairperson of a service center may visit a place where the electronic apparatus is set. If the electronic apparatus is complicated, it is not easy for the repairperson to check where an error occurred in the electronic apparatus while visiting, and thus it is difficult to immediately make repairs.

SUMMARY OF THE INVENTION

Accordingly, an aspect of the present invention is to provide an electronic apparatus, a remote controller and an error detecting method, in which an error can be correctly and easily detected.

Another aspect of the present invention is to provide an electronic apparatus, a remote controller and an error detecting method, in which a driving module where an error occurred can be individually checked.

Still another aspect of the present invention is to provide an electronic apparatus, a remote controller and an error detecting method, which can reduce time and costs taken in repairing an error.

The foregoing and/or other aspects of the present invention can be achieved by providing an electronic apparatus with a plurality of driving modules, including an error warning unit which warns a user of error information; a user interface which generates a module mapping signal corresponding to the individual driving module; and a controller which determines whether an error occurs in the driving module corresponding to the module mapping signal and controls the error warning unit to warn a user of the error information if it is determined that the driving module has an error.

The user interface may include a remote controller capable of remotely communicating with the controller.

The remote controller may include a plurality of buttons capable of selecting different driving modules.

The remote controller may include a predetermined button, and the controller may identify the module mapping signal corresponding to each driving module according to the number of control signals generated by the button.

The remote controller may include a touch panel where a graphic user interface is displayed for generating the module mapping signal, and interacts with the controller, and the controller may control the remote controller to display error information on the touch panel when an error occurs in the driving module corresponding to the module mapping signal.

The electronic apparatus may further include a housing which accommodates the driving module, wherein the user interface includes a plurality of buttons formed in an outer surface of the housing.

The error warning unit may include a light emitting unit that flickers, or a sound outputting unit that beeps out a warning.

The controller may include a central processing unit which determines whether communication with the driving module is possible; and a microcomputer which receives the module mapping signal and controls the error warning unit to indicate the error information according to results from determination of the central processing unit.

The electronic apparatus may further include a display panel which displays a video signal, wherein the driving module includes at least two among a panel driver to drive the display panel, a tuner to receive a broadcasting signal, an audio processor to process an audio signal, a video processor to process a video signal, a power supply to supply power, an external input interface, and a storage to store data about driving.

Another aspect of the present invention can be achieved by providing an electronic apparatus with a plurality of driving modules, including an error warning unit which warns a user of error information; and a controller which determines whether an error occurs in the driving module corresponding to a module mapping signal when the module mapping signal is received corresponding to the individual driving module, and controls the error warning unit to warn a user of the error information if it is determined that the driving module has an error.

Still another aspect of the present invention can be achieved by providing a remote controller capable of remotely controlling an electronic apparatus with a plurality of driving modules, the remote controller including: a user selection unit through which a user individually selects the driving module; and a communicating unit which outputs a module mapping signal corresponding to the driving module selected by a user to the electronic apparatus.

Yet another aspect of the present invention can be achieved by providing an error detecting method of an electronic apparatus with a plurality of driving modules, the method including: receiving a module selection signal to select one of the plurality of driving modules; determining whether an error occurs in the driving module corresponding to the received module selection signal; and warning a user of error information when an error occurs in the driving module according to determination results.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
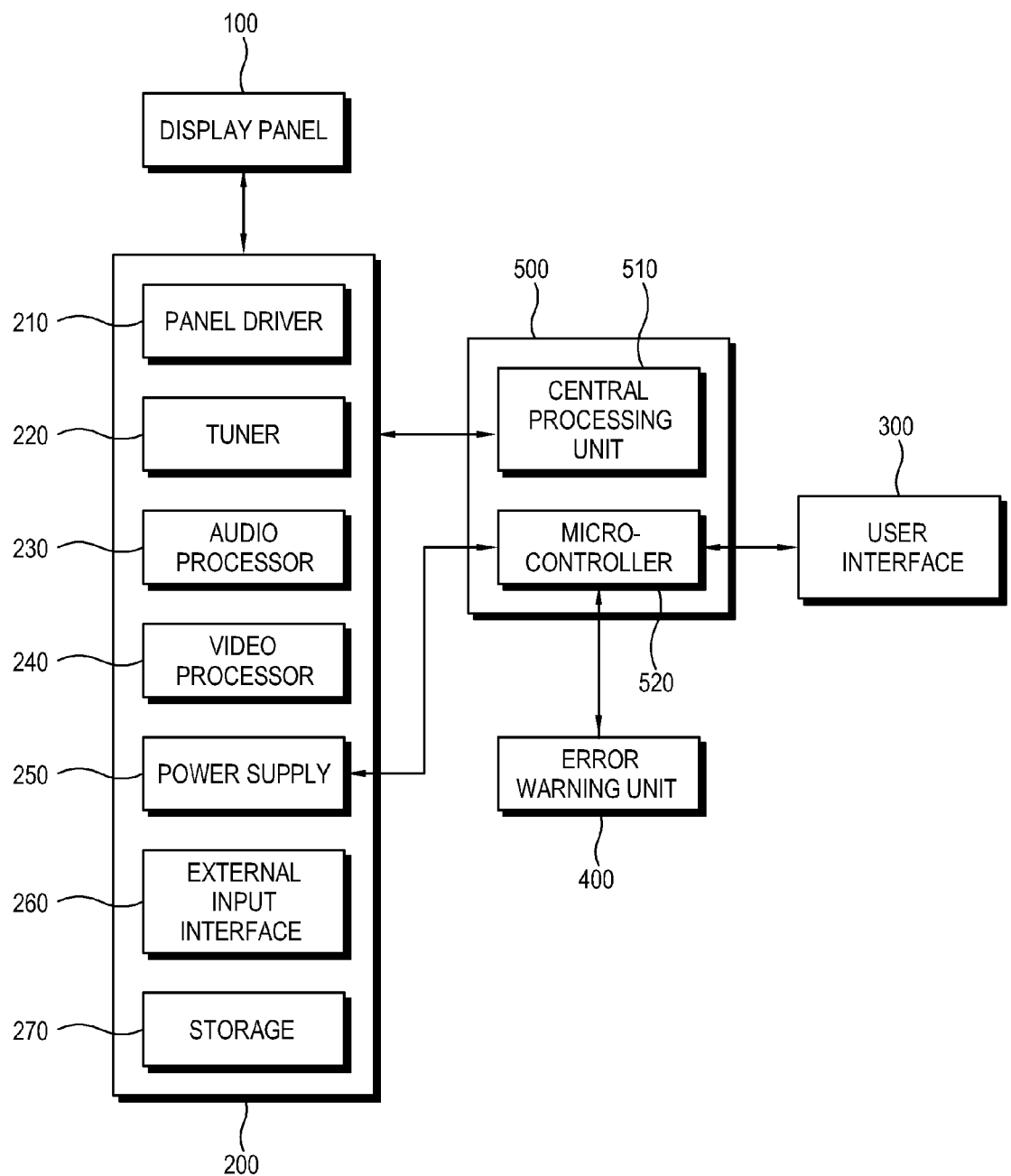
FIG. 1 is a control block diagram of an electronic apparatus according to an exemplary embodiment of the present invention.

Below, exemplary embodiments of the present invention will be described in detail with reference to accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout. Further, expressions such as "at least one of," when preceding a list of elements, modifies the entire list of elements and does not modify each element of the list.

FIG. 1 is a control block diagram of an electronic apparatus according to an exemplary embodiment of the present invention. As shown therein, an electronic apparatus includes a display panel 100, a driving module 200, a user interface 300, an error warning unit 400, and a controller 500. In this exemplary embodiment, the electronic apparatus may include a display apparatus having a display panel 100. For example, the electronic apparatus in this exemplary embodiment may be a television capable of receiving a broadcasting signal. However, the electronic apparatus is not limited to the television, and may include electric home appliances, a content reproducer, an imaging device such as a camera, a personal terminal, a computer, etc. as long as it has the user interface for selecting the driving module 200.

The display panel 100 displays an image, and may be achieved by a cathode ray tube (CRT), a liquid crystal display (LCD) panel, an organic light emitting diode (OLED) panel, or a plasma display panel (PDP), etc.

The driving module 200 means various driving elements included in the electronic apparatus. In this exemplary embodiment, the driving module 200 includes all chips capable of communicating with the central processing unit 510 (see FIG. 2). For example, the driving module 200 may include any module to be controlled by the central processing unit 510 through inter-integrated circuit (I2C) communication with the central processing unit 510. The driving module 200 includes a panel driver 210 for driving the display panel 100, a tuner 220 for receiving a broadcasting signal, an audio processor 230 for processing an audio signal, a video processor 240 for processing a video signal, a power supply 250 for supplying power, an external input interface 260, a storage 270 for storing data about driving, etc. The configuration of the panel driver 210 may vary depending on the kinds of display panel 100. For example, if the display panel 100 is a PDP, the panel driver 210 may be achieved by a PDP logic board. If the display panel 100 is an LCD panel, the panel driver 210 may be achieved by a frame rate converter (FRC) board. The audio processor 230 may include an audio codec and an audio chip, and the video processor 240 may include a scaler. The external input interface 260 may include Ethernet and an interface through which an external source is connected to and provides an image to the electronic apparatus. The storage 270 includes a double data rate random access memory (DDR RAM), a flash memory, etc. Meanwhile, the power supply 250 may be included in the driving module 200 according to this exemplary embodiment since it can directly communicate with the microcontroller 520 without the central processing unit 510. The microcontroller 520 determines whether the driving module is to operate normally (without error) or abnormally without communicating with the central processing unit 510.

In the case that the display panel 100 is the LCD panel, a dimming board for driving a backlight assembly may also be included in the driving module 200. Further, the driving module 200 may include a channel chip (not shown), various controllers, etc.

If many modules corresponding to a plurality of functions are integrated into one chip, the one integrated chip may be used as the driving module 200. Like this, the driving module 200 is not limited to the foregoing descriptions. Further, since the exemplary embodiments of the present invention may be applied to the electronic apparatus including one or more driving modules 200, there is no limit to the number of driving modules 200.

The user interface 300 generates a module mapping signal corresponding to the individual driving module 200. A user may select one of the driving modules 200 through the user interface 300, and at this time a signal generated by the user interface 300 is used as a module mapping signal for identifying a selected driving module 200 among the plurality of driving modules 200. Here, the user interface 300 may be provided in the form of a plurality of buttons or a touch panel which can individually map the driving module 200.

Meanwhile, the module mapping signals may not be generated with respect to all driving modules 200 included in the electronic apparatus. For example, the module mapping signals may be generated with respect to only the driving modules 200 in which an error frequently occurred or only certain driving modules 200 selected by a user.

The error warning unit 400 warns a user of error information under control of the controller 500 when an error occurs in the driving module 200. The error warning unit 400 may include a light emitting unit that flickers or a sound outputting unit that beeps out a warning when an error occurs. Also, the error warning unit 400 may output error information in forms different according to the driving modules 200 so that a user can readily identify the error. For example, the light emitting unit may flicker once when an error occurs in the video processor 240, but twice when an error occurs in the audio processor 230.

The controller 500 may determine whether an error occurs in the driving module 200 corresponding to the module mapping signal, and control the error warning unit 400 to warn a user of error information when it is determined that an error has occurred in the driving module 200. The controller 500 includes the central processing unit 510 that determines whether it is possible to communicate with the driving module 200, and the microcontroller 520 that controls the error warning unit 400 to indicate the error information according to determination results of the central processing unit (CPU) 510.

When a user turns on the electronic apparatus, the microcontroller 520 controls the power supply 250 to supply power to the central processing unit 510 and the driving module 200. When power is supplied, communication for system initialization, i.e., communication for booting, is implemented between the central processing unit 510 and the driving module 200. If the communication between the central processing unit 510 and the driving module 200 is not implemented normally, the electronic apparatus cannot operate normally. The central processing unit 510 may store communicability, e.g., the status or level of the ability to communicate, between the driving modules 200 in the microcontroller 520, and the microcontroller 520 may determine whether an error occurs in the driving module 200 on the basis of the stored communicability.

When a user turns on a television but the television does not display a broadcasting signal normally, he/she may detect whether a certain driving module 200 has an error through the user interface 300. In a conventional electronic apparatus such as a television, if a broadcasting signal is not displayed normally on a screen, the television is generally sent to a service center to be checked as to where an error occurred. In this case, an individual inspection signal is applied to every driving module while separating a housing from the television. In this case, it takes a large amount of time and effort until a part having an error is detected and identified. Further, the service center cannot detect where an error occurred before disassembling the television and applying the inspection signal, and thus cannot have any information about which tools will be required or which part will need to be replaced.

In this exemplary embodiment, a user may individually select each driving module 200 through the user interface 300 when the electronic apparatus is not operating properly. The controller 500 individually detects whether the selected driving module 200 has an error, and informs a user of detection results through the error warning unit 400. Thus, a user can easily perceive which driving module 200 has an error, and the error information may be sent to a distant service center. The service center acquires correct information about a part to be repaired before visiting a user, so that the probability of sending the electronic apparatus to the service center can be decreased. Also, repairing charges and other incidental charges may be reduced.

Figure 2:
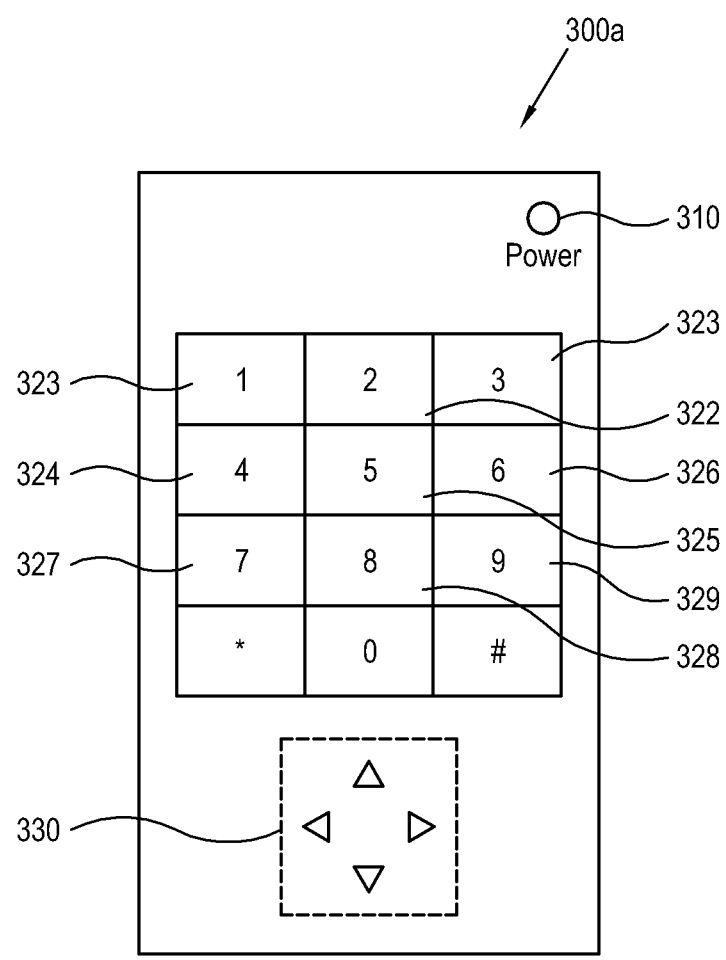
FIG. 2 shows a user interface according to an exemplary embodiment of FIG. 1.

FIG. 2 shows a user interface according to an exemplary embodiment of FIG. 1. The user interface 300 in this exemplary embodiment is achieved by a remote controller 300a that can remotely communicate with the controller 500.

The remote controller 300a includes a power button 310 for turning on the electronic apparatus, a plurality of numeral buttons 321 to 329, and other buttons such as direction buttons 330. A user may select different driving modules 210 to 270 through the plurality of buttons 320 and 330 except the power button 310. For example, the numeral buttons 321 to 327 may be assigned to key codes corresponding to the individual driving modules 210 to 270. In this case, a user may select a "1" button 321 to check whether the panel driver 210 has an error, and a "2" button 322 to check whether a tuner 220 has an error. The remote controller 300a may include a communicating unit (not shown) to output a module mapping signal corresponding to the driving module 210 to 270 selected by a user to the controller 500. Also, the remote controller 300a may include a touch panel capable of receiving a signal through a pointing device instead of the buttons.

Alternatively, the driving modules 210 to 270 may be selected by not the numeral buttons 321 to 327 but the direction button 330. If the number of direction buttons 330 is smaller than the number of driving modules 210 to 270 to be checked as to whether an error occurs, a user may select the driving module 200 by altering the number of pressing times, i.e., by changing the number of control signals generated every time when pressing the direction button 330. For example, if an up button is selected once, the module mapping signal may be generated corresponding to the panel driver 210. If the up button is selected twice, the module mapping signal may be generated corresponding to the tuner 220. The controller 500 identifies the module mapping signal according to the number of control signals received from the remote controller 300a, and determines whether the driving module 210 to 270 corresponding to the identified module mapping signal has an error.

Figure 3:
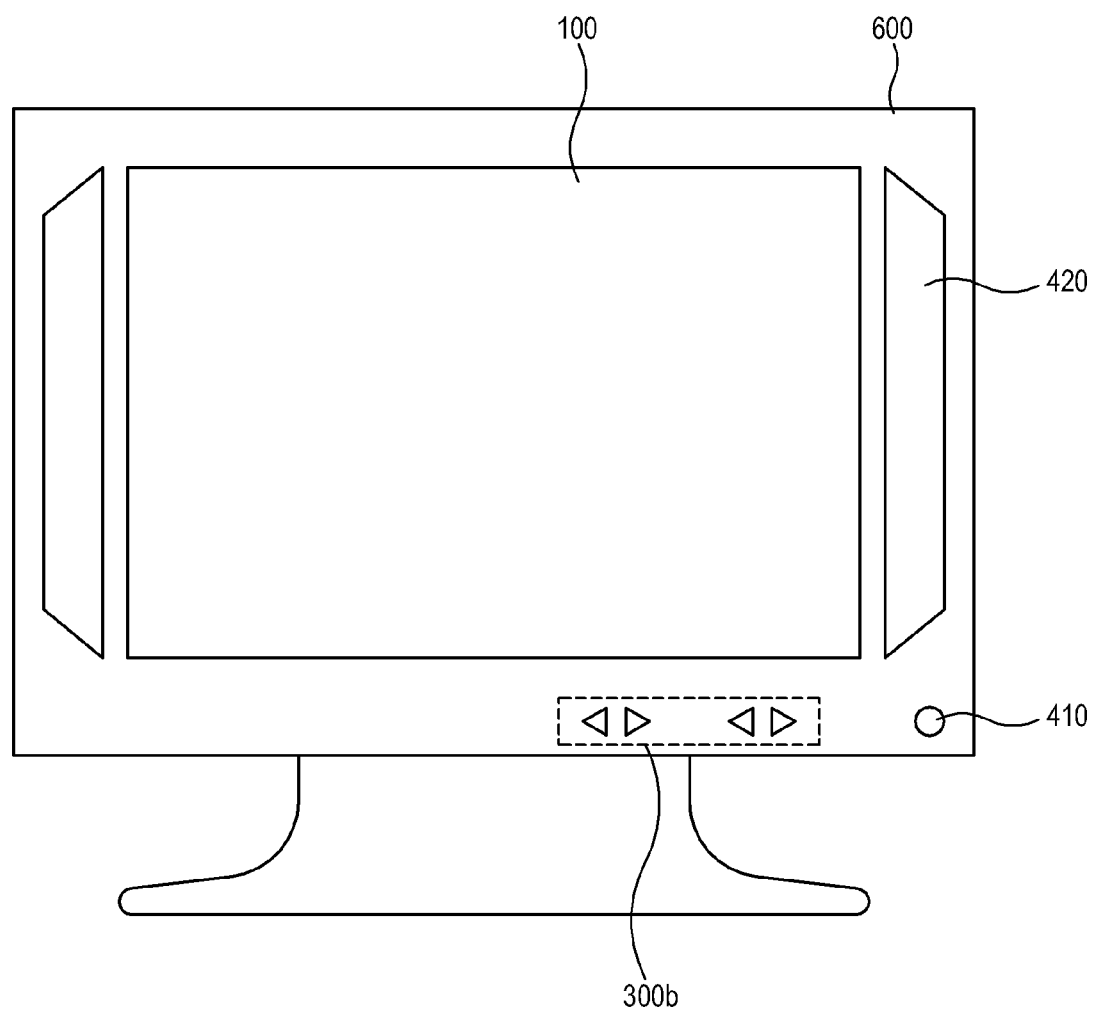
FIG. 3 shows a user interface according to another exemplary embodiment of FIG. 1.

FIG. 3 shows a user interface according to another exemplary embodiment of FIG. 1.

The electronic apparatus in this exemplary embodiment includes a housing 600 to accommodate the display panel 100 and the driving module 200, and the user interface 300 includes a plurality of buttons 300b provided on an outer surface of the housing 600. In general, the button 300b may be achieved by a panel key used in a channel control, a volume control, a screen control, etc. When the button 300b of the user interface 300 is used for selecting the driving module 200, the user interface 300 begins to communicate with the microcontroller 520.

The error warning unit 400 may include a light emitting unit 410 configured as a flickering lamp, and may be achieved by a sound outputting unit 420 that beeps.

Alternatively, the user interface 300 may be achieved by various input devices except the buttons 300b provided in the housing 600 as long as they can communicate with the microcomputer 520.

Figure 4:
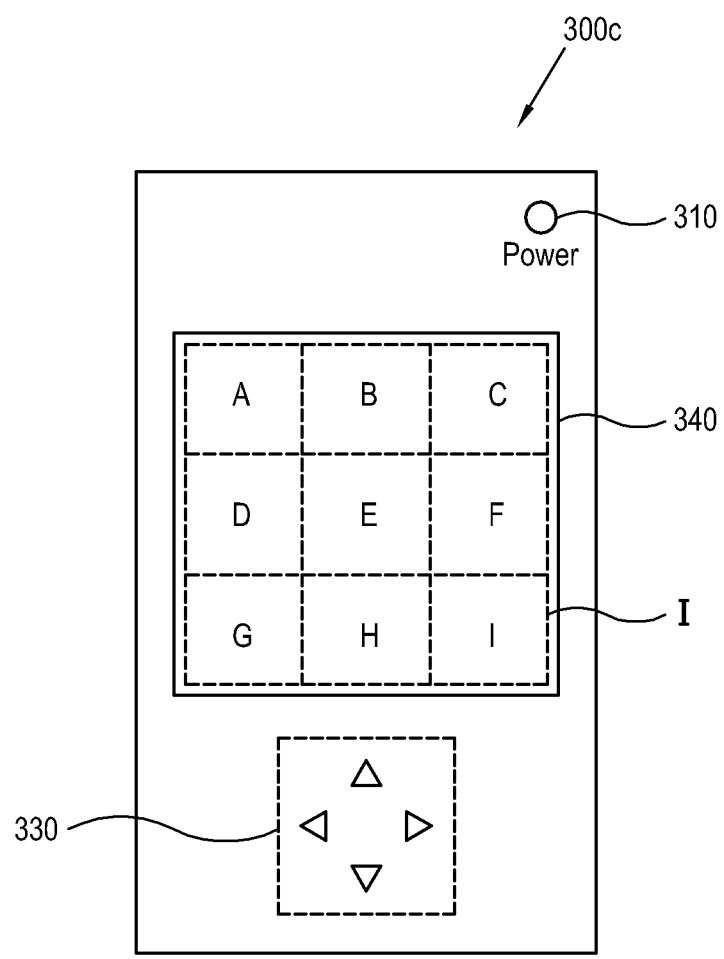
FIG. 4 shows a user interface according to still another exemplary embodiment of FIG. 1.

FIG. 4 shows a user interface according to still another exemplary embodiment of FIG. 1. The user interface 300 in this exemplary embodiment is achieved by the remote controller 300c as shown in FIG. 2. The remote controller 300c in this exemplary embodiment may include a touch panel 340 where a graphic user interface (GUI) I is displayed for generating the module mapping signal, and interacting with the controller 500.

The GUI I displayed on the touch panel 340 may include a latticed pattern divided into a plurality of sections, wherein the sections are marked with identification letters A to I for selecting the driving modules 210 to 270, respectively. A user may select one of the identification letters A to I, and the remote controller 300c may output the module mapping signal corresponding to the selected driving module 210 to 270 to the controller 500.

If an error occurs in the driving module 210 to 270 corresponding to the module mapping signal, the controller 500 controls the remote controller 300c to display error information on the touch panel 240. That is, the controller 500 transmits the error information to the remote controller 300c, and the remote controller 300c displays the received error information on the touch panel 340. The error information may be displayed in such a manner that the identification letter A to I is highlighted or shaded. In short, according to this exemplary embodiment, the error warning unit 400 for indicating the error information is included in the user interface 300 capable of remotely communicating with the controller 500.

Figure 5:
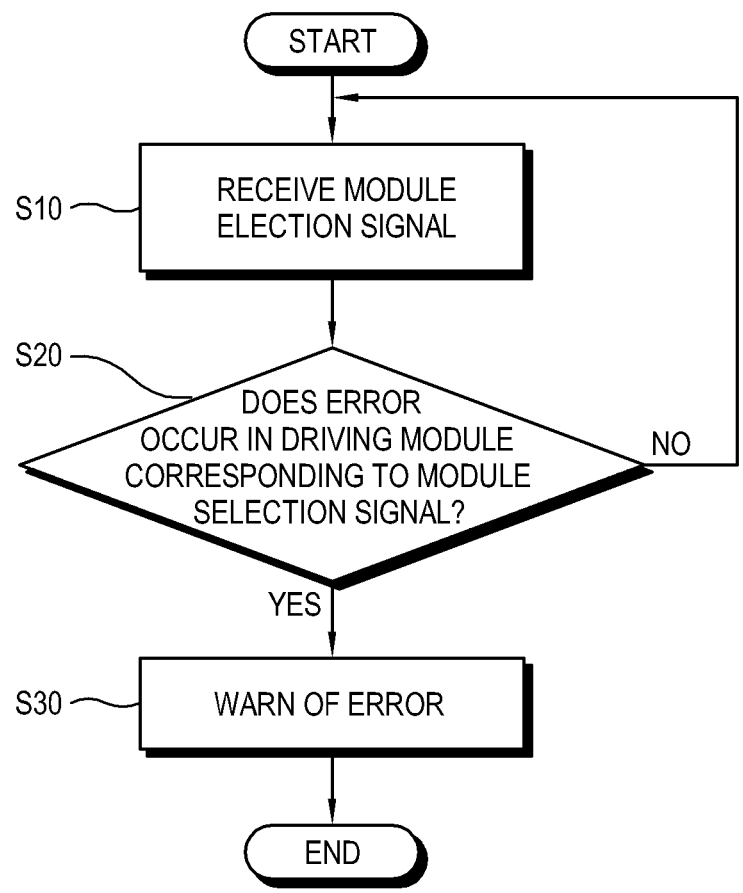
FIG. 5 is a control flowchart for explaining an error detecting method of an electronic apparatus according to an exemplary embodiment of the present invention.

FIG. 5 is a control flowchart for explaining an error detecting method of an electronic apparatus according to an exemplary embodiment of the present invention.

First, if a certain driving module 210 to 270 is selected by a user, the module mapping signal mapped to the selected driving module 210 to 270, i.e., a module selection signal, is generated. The microcomputer 520 receives the module selection signal at operation S10. The module selection signal may be generated, for example, by the button provided in the housing of the electronic apparatus, or by the remote controller capable of remotely communicating with the controller 500.

At operation S20, the microcomputer 520 determines whether an error has occurred in the driving module 210 to 270 corresponding to the module selection signal.

If it is determined that the corresponding driving module 210 to 270 has an error, the error warning unit 400 indicates the error information at operation S30.

If it is determined that the corresponding driving module 210 to 270 has no error, a user may select another driving module 210 to 270 through the user interface 300, so that the foregoing operations can be repeated with respect to the selected driving module 210 to 270.

Figure 6:
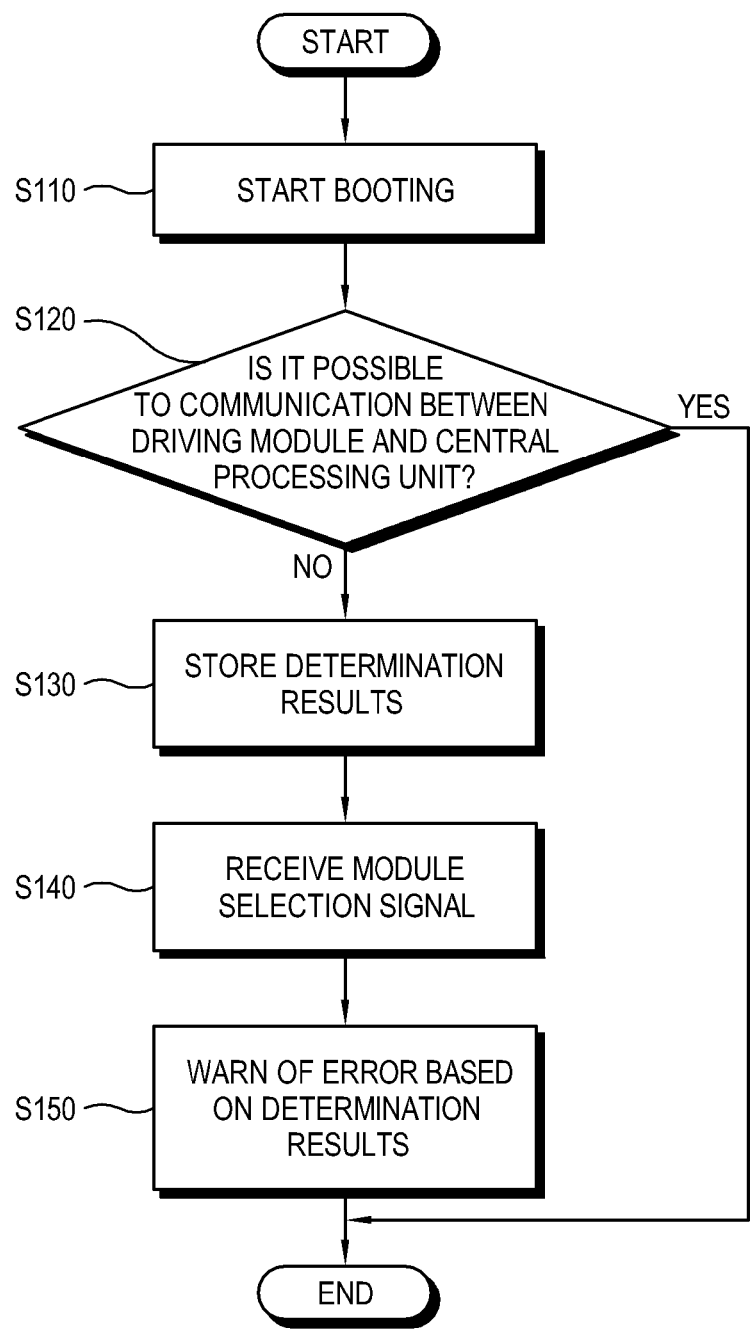
FIG. 6 is a control flowchart for explaining an error detecting method of an electronic apparatus according to another exemplary embodiment of the present invention.

FIG. 6 is a control flowchart for explaining an error detecting method of an electronic apparatus according to another exemplary embodiment of the present invention.

At operation S110, a user turns on the electronic apparatus, thereby starting booting.

At operation S120, the central processing unit 510 supplied with the power determines whether communication with each driving module 210 to 270 is possible.

If it is determined that the communication between the driving module 210 to 270 and the central processing unit 510 is possible, general booting is implemented. Otherwise, a determination result of communication impossibility is stored in the microcomputer 520 at operation S130.

If the communication between the driving module 200 and the central processing unit 510 is impossible, a user may select the driving module 210 to 270 through the user interface 300 so as to detect whether an error occurred.

The microcomputer 520 receives the module selection signal for identifying the individual driving module 200 at operation S140, and controls the error warning unit 400 to warn a user of the error information on the basis of the stored determination results at operation S150.

As described above, there are provided an electronic apparatus, a remote controller and an error detecting method, in which an error can be correctly and easily detected.

Also, there are provided an electronic apparatus, a remote controller and an error detecting method, in which a driving module where an error occurred can be individually checked.

Further, there are provided an electronic apparatus, a remote controller and an error detecting method, which can reduce time and costs taken in repairing an error.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An electronic apparatus with a plurality of driving modules, comprising:
   a display panel which displays a video signal;
   a user interface which generates a module mapping signal corresponding to a driving module of the plurality of driving modules;
   a controller which determines whether an error has occurred in the driving module corresponding to the module mapping signal; and
   an error warning unit controlled by the controller and which warns a user of error information if it is determined that at least one driving module of the plurality of driving modules has an error,
   wherein the error warning unit comprises at least one of a light emitting unit which outputs a flickering light and a sound outputting unit which outputs a warning sound, and
   wherein the controller controls the light emitting unit to output the flickering light or the sound outputting unit to output the warning sound, when the display panel cannot display the video signal due to the at least one driving module of the plurality of driving modules having an error.

2. The electronic apparatus according to claim 1, wherein the user interface comprises a remote control capable of remotely communicating with the controller.

3. The electronic apparatus according to claim 2, wherein the remote control comprises a plurality of buttons capable of selecting different ones of the plurality of driving modules.

4. The electronic apparatus according to claim 2, wherein the remote control comprises a predetermined button, and
   wherein the controller identifies the module mapping signal corresponding to the driving module of the plurality of driving modules according to a number of control signals generated by the predetermined button.

5. The electronic apparatus according to claim 2, wherein the remote control comprises a touch panel that displays a graphic user interface for generating the module mapping signal, and interacts with the controller, and
   wherein the controller controls the remote control to display the error information on the touch panel when the error occurs in the driving module of the plurality of driving modules corresponding to the module mapping signal.

6. The electronic apparatus according to claim 1, further comprising a housing which accommodates the driving module,
   wherein the user interface comprises a plurality of buttons formed in an outer surface of the housing.

7. The electronic apparatus according to claim 1, wherein the controller comprises:
   a central processing unit which determines in a determination whether communication with the driving module of the plurality of driving modules is possible; and
   a microcomputer which receives the module mapping signal and controls the error warning unit to indicate the error information according to the determination of the central processing unit.

8. The electronic apparatus according to claim 1,
   wherein the driving module of the plurality of driving modules comprises at least two among a panel driver which drives the display panel, a tuner which receives a broadcasting signal, an audio processor which processes an audio signal, a video processor which processes the video signal, a power supply which supplies power, an external input interface, and a storage which stores data about driving.

9. An electronic apparatus with a plurality of driving modules, comprising:
   a display panel which displays a video signal;
   a controller which determines whether an error has occurred in at least one driving module of the plurality of driving modules corresponding to a module mapping signal when the module mapping signal corresponding to the driving module of the plurality of driving modules is received; and
   an error warning unit controlled by the controller, which warns a user of error information if it is determined that the driving module of the plurality of driving modules has an error,
   wherein the error warning unit comprises at least one of a light emitting unit which outputs a flickering light and a sound outputting unit which outputs a warning sound, and
   wherein the controller controls the light emitting unit to output the flickering light or the sound outputting unit to output the warning sound, when the display panel cannot display the video signal due to the at least one driving module of the plurality of driving modules having an error.

10. The electronic apparatus according to claim 9, wherein the controller comprises:
   a central processing unit which determines in a determination whether communication with the driving module of the plurality of driving modules is possible; and
   a microcomputer which receives the module mapping signal and controls the error warning unit to indicate the error information according to the determination of the central processing unit.

11. An error detecting method of an electronic apparatus with a plurality of driving modules, the method comprising:
   receiving a module selection signal to select a driving module of the plurality of driving modules;
   determining whether an error has occurred in the driving module corresponding to the received module selection signal; and
   warning a user of error information when an error occurs in the driving module according to the determining,
   wherein the warning comprises outputting a flickering light or outputting a warning sound, when a display panel comprised in the electronic apparatus cannot display a video signal due to at least one driving module of the plurality of the driving modules having an error.

12. The method according to claim 11, further comprising determining by a central processing unit whether communication with the driving module is possible; and
   receiving by a microcomputer the module selection signal and controlling by the microcomputer an error warning unit to indicate the error information according to the determining by the central processing unit.

13. The method according to claim 11, wherein the module selection signal is received from a remote controller comprising a plurality of buttons capable of selecting different driving modules.

* * * * *